US007770176B2

(12) United States Patent
Maeda et al.

(10) Patent No.: US 7,770,176 B2
(45) Date of Patent: Aug. 3, 2010

(54) MULTIPROCESSOR COMPUTER AND PROGRAM (75) Inventors: Seiji Maeda, Kawasaki (JP); Tatsunori Kanai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1334 days.

(21) Appl. No.: 11/233,026

(22) Filed: Sep. 23, 2005

(65) Prior Publication Data

US 2006/0070074 A1 Mar. 30, 2006

(30) Foreign Application Priority Data

Sep. 30, 2004 (JP) ............................. 2004-287309

(51) Int. Cl.
*G06F 9/46* (2006.01)
*G06F 1/00* (2006.01)

(52) U.S. Cl. ........................ 718/105; 713/323; 713/324; 713/330

(58) Field of Classification Search ................. 718/105; 713/323, 324, 330
See application file for complete search history.

(56) References Cited

U.S. PATENT DOCUMENTS

| 6,505,004 | B2 | | 1/2003 | Kojima et al. | |
| 7,076,781 | B2 | * | 7/2006 | Skovira | 718/102 |
| 7,360,102 | B2 | * | 4/2008 | Inoue | 713/300 |
| 2003/0110012 | A1 | * | 6/2003 | Orenstien et al. | 702/188 |
| 2004/0098718 | A1 | | 5/2004 | Yoshii et al. | |
| 2004/0268083 | A1 | | 12/2004 | Kanai et al. | |
| 2004/0268353 | A1 | | 12/2004 | Kanai et al. | |
| 2004/0268354 | A1 | | 12/2004 | Kanai et al. | |
| 2005/0060709 | A1 | | 3/2005 | Kanai et al. | |
| 2005/0066330 | A1 | | 3/2005 | Kanai et al. | |
| 2005/0108715 | A1 | | 5/2005 | Kanai et al. | |
| 2005/0278520 | A1 | * | 12/2005 | Hirai et al. | 713/1 |

FOREIGN PATENT DOCUMENTS

| JP | 8-6681 | 1/1996 |
| WO | WO 03/083693 A1 | 10/2003 |

OTHER PUBLICATIONS

Chandrakant Patel, et al., "Energy Aware Grid: Global Workload Placement based on Energy Efficiency", HP Labs Technical Report, XP-002351253, Dec. 6, 2002, pp. 1-10.
Tao Li, et al., "Run-time Modeling and Estimation of Operating System Power Consumption", SIGMETRICS'03, XP-002371350, Jun. 10-14, 2003, pp. 160-171.

(Continued)

*Primary Examiner*—Meng-Ai An
*Assistant Examiner*—Nikhil Krishnan
(74) *Attorney, Agent, or Firm*—Oblon, Spivak, McClelland, Maier & Neustadt, L.L.P.

(57) ABSTRACT

According to an aspect of the present invention, the processor temperatures can be leveled among processors, thereby suppressing the occurrence of stop of processing due to overheating. For example, on the basis of the temperatures of the processors sensed by temperature sensors, the control IC assigns the processor whose temperature is the lowest to the task whose heat emission is the highest. This makes it possible to level the processor temperatures among processors and suppress occurrence of stop of processing due to overheating.

2 Claims, 6 Drawing Sheets

OTHER PUBLICATIONS

Erven Rohou, et al. "Dynamically Managing Processor Temperature and Power", $2^{nd}$ Workshop on Feedbackdirected Optimization, XP-002383576, 1999, pp. 1-8.

J. W. S. Liu, "Commonly Used Approaches to Real-Time Scheduling", Real-time systems, Chapter 4, 2000, pp. 60-84.

U.S. Appl. No. 12/172,285, filed Jul. 14, 2008, Kanai, et al.

U.S. Appl. No. 11/232,984, filed Sep. 23, 2005, Maeda et al.

* cited by examiner

MULTIPROCESSOR COMPUTER AND PROGRAM

CROSS-REFERENCE TO RELATED APPLICATIONS

This application is based upon and claims the benefit of priority from prior Japanese Patent Application No. 2004-287309, filed Sep. 30, 2004, the entire contents of which are incorporated herein by reference.

BACKGROUND OF THE INVENTION

1. Field of the Invention

This invention relates to a multiprocessor computer and a program which can assign tasks to a plurality of processors, in particular, a multiprocessor computer and a program which can level the processor temperatures among processors and suppress occurrence of stop of processing due to overheating.

2. Description of the Related Art

In the field of controlling the lines in factories and plants, widely used are computers performing control in synchronization with real time with which the object to be controlled operates. Such computers are equipped with hardware and software designed to achieve real-time processing.

Real-time processing is used for not only control processes in factories but also business information management processes and electronic commerce processes, and video process in a multimedia processes.

As computers of this kind, used is a multiprocessor computer which simultaneously uses a plurality of processors, if a required processing power is higher than a processing power of a single processor.

In many multiprocessor computers, a plurality of processes are assigned to one processor to use not only real-time processing but also the processing capability of each processor effectively.

When performing a process, a multiprocessor computer divides the process into processing units, i.e., tasks, assigns processors of numbers necessary for executing respective tasks, and executes the task. If a task requires a plurality of processors, an execution unit to be processed on each processor may be called a thread. Further, if a task and threads forming the task are executed over a plurality of periods on a processor, each period may be called a job. For example, a task which requires two processors is periodically executed, the task is formed of two threads, the number of which is the same as the number of processors to be used, and each thread is periodically executed as a job.

If a plurality of tasks are executed in a multiprocessor computer, it is necessary to schedule to determine the execution order of the tasks. Between scheduling methods, there is a scheduling method called dynamic scheduling in which the execution order of a job is determined when the job is actually carried out on the processor.

In the meantime, assigning a job to a processor which actually execute the job is called "dispatching". In the dynamic scheduling method, scheduling and dispatching are done at the same time.

Algorithms for performing dynamic scheduling include a priority scheduling algorithm that does scheduling on the basis of the priority given to each task. An algorithm that does not change the priority once given is called a fixed priority scheduling algorithm. An algorithm that dynamically changes priority is called a dynamic priority scheduling algorithm.

The priority scheduling algorithm includes a method of determining the priority of a task or a job on the basis of the parameter of the task. An EDF (Earliest Deadline First) scheduling algorithm is a dynamic scheduling algorithm that decides priority on the basis of the deadline of the task or job. In addition, the EDF scheduling algorithm is a real-time scheduling algorithm that makes a feasibility check of scheduling and can assure that all tasks can keep real-time constraints (for example, refer to J. W. S. Liu, Real-Time Systems, Prentice Hall, 2000).

A multiprocessor computer having the above structure has no particular problem under normal conditions. However, according to the inventers' study, such a multiprocessor computer performs scheduling and dispatching in consideration of only priority, processing performance, and real-time processing. Therefore, the heat emission becomes unlevel among the processors, and noise (the sound of a fan, etc) caused by cooling of the heated processors increases. In the end, stop of processing may occur due to overheating.

BRIEF SUMMARY OF THE INVENTION

The object of the present invention is to provide a multiprocessor computer and a program which can level the processor temperature among processors and suppress occurrence of stop of processing due to overheating.

According to a first aspect of the present invention, there is provided a multiprocessor computer which executes tasks with a plurality of processors connected to one another, the multiprocessor computer comprising: a plurality of temperature sensing devices configured to sense the temperatures of the plurality of processors; an extraction device configured to, when at least one of the plurality of processors is executing a plurality of tasks, extract one or more processors that execute none of the plurality of tasks; a first selection device configured to select one processor whose temperature sensed by the temperature sensing devices is the lowest from one or more processors selected by the extraction device; a second selection device configured to, when a plurality of tasks to be newly executed are assigned to any ones of the processors extracted by the extraction device, refer to the heat emissions included in the plurality of tasks to be newly executed and select a task whose heat emission is the highest; and an assignment device configured to assign the task selected by the second selection device to the processor selected by the first selection device.

Further, according to the first aspect of the present invention, the processor whose temperature is the lowest is assigned to a task whose heat emission is the highest. This structure enables a level processor temperatures among the processors, and suppresses occurrence of stop of process due to overheating.

DETAILED DESCRIPTION OF THE INVENTION

Embodiments of the present invention are explained below with reference to drawings. Although a multiprocessor computer including 4 processors is used in the following explanation, the number of processors may be any number being at least 2. Further, although the processors are formed on respective separate chips in the following embodiments, an on-chip multiprocessor may be used in which a plurality of processors are formed by one chip may. Further, although in the following examples the multiprocessor is formed of one or more system controlling processor (a control IC 13 in FIG. 2) and a plurality of task processors (P1 to P4 in FIG. 2), the present invention is not limited to this structure, but a system controlling processor may also serve as a task processor. Furthermore, the system controlling processor and the task processors may be of different instruction set architectures. Processors to which threads are assigned are always task processors. Therefore, in the case of assigning threads, a task processing processor is simply referred to as "processor" hereinafter.

First Embodiment

Figure 1:
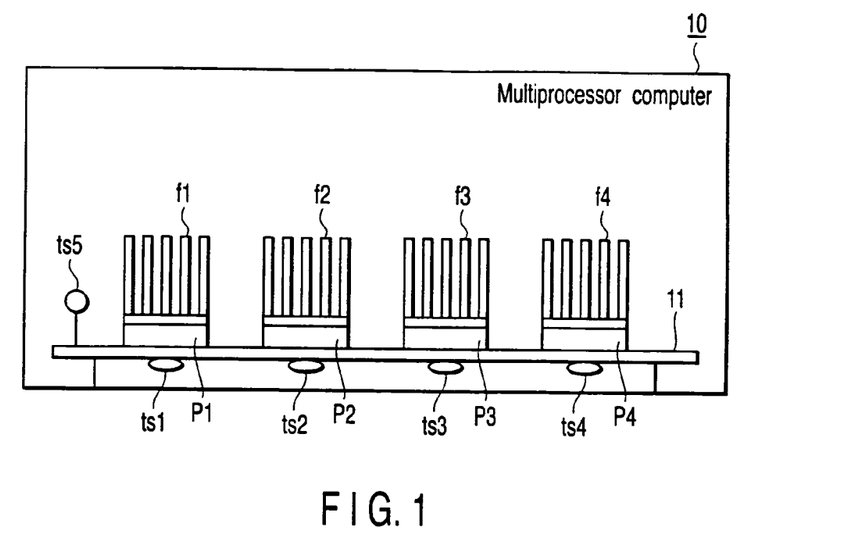
FIG. 1 is a schematic diagram illustrating a structure of a multiprocessor computer according to a first embodiment of the present invention.

FIG. 1 is a schematic diagram illustrating a structure of a multiprocessor computer according to a first embodiment of the present invention. In a multiprocessor computer 10, four processors P1 to P4 are mounted on a board 11.

Cooling fins f1 to f4 for cooling are attached to the processors P1 to P4, respectively. A cooling fan may be attached to each of the cooling fins f1 to f4. As a cooling system, a water cooling system may be adopted.

Under the board 11, temperature sensors ts1 to ts4 for measuring the temperatures of the respective processors are provided direct under the processors P1 to P4, respectively. The temperature sensors ts1 to ts4 may be provided on upper surfaces of the processors P1 to P4, or may be included in the chips of the processors P1 to P4. In the case of using an on-chip multiprocessor, it is desirable that the temperature sensors ts1 to ts4 are included in a chip such that the sensors can measure the temperatures of the processors P1 to P4, respectively.

In a casing of the multiprocessor computer 10, a temperature sensor ts5 is stood on the board 11 to measure the temperature in the casing. The temperature sensor ts5 is preferably provided in a position in which the sensor ts5 is not influenced by heat radiating members such as the processors P1 to P4. A thermocouple, for example, may be used as the temperature sensor ts5. Values measured by the temperature sensors ts1 to ts5 are subjected to analog-digital (A/D) conversion and the like so as to be received by a computer program.

Further, the temperature sensor ts5 is a constituent element which is provided if temperature measurement in the casing is required, and may be omitted if temperature measurement in the casing is unnecessary.

Figure 2:
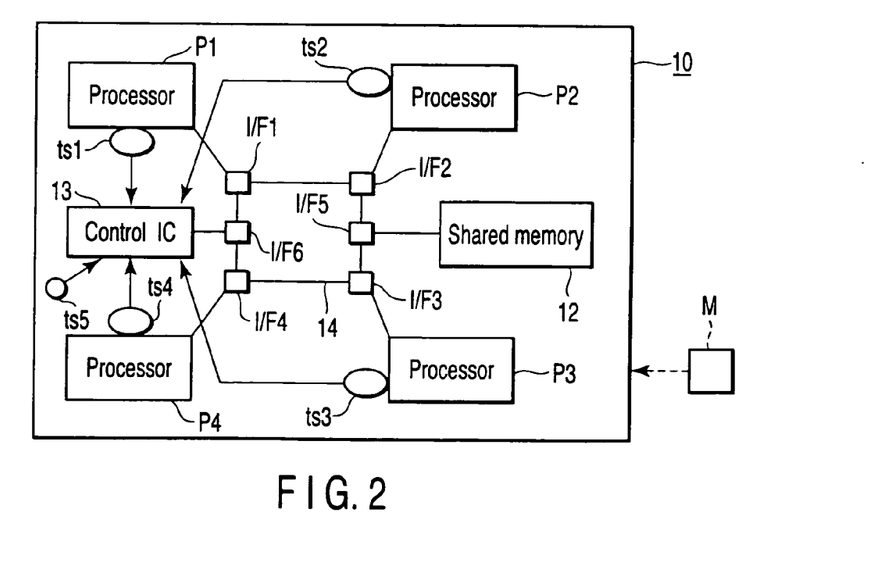
FIG. 2 is a schematic diagram illustrating a system structure in the embodiment.

Next, the system structure of the multiprocessor computer 10 having the above structure is explained. As shown in FIG. 2, the multiprocessor computer 10 has a structure in which the processors P1 to P4, a shared memory 12 and a control IC 13 are connected to a ring-shaped interconnect 14, via interfaces I/F1 to I/F6, respectively.

In this structure, the processors P1 to P4 correspond to the task processors described above, and are controlled by the control IC 13.

Figure 3:
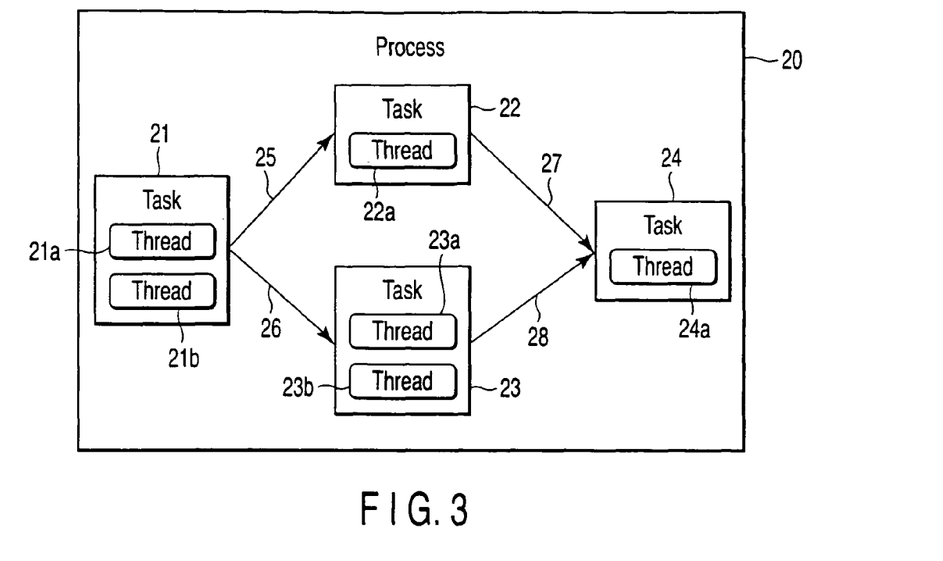
FIG. 3 is a schematic diagram for explaining concepts of a process, a task and a thread in the embodiment.
Figure 4:
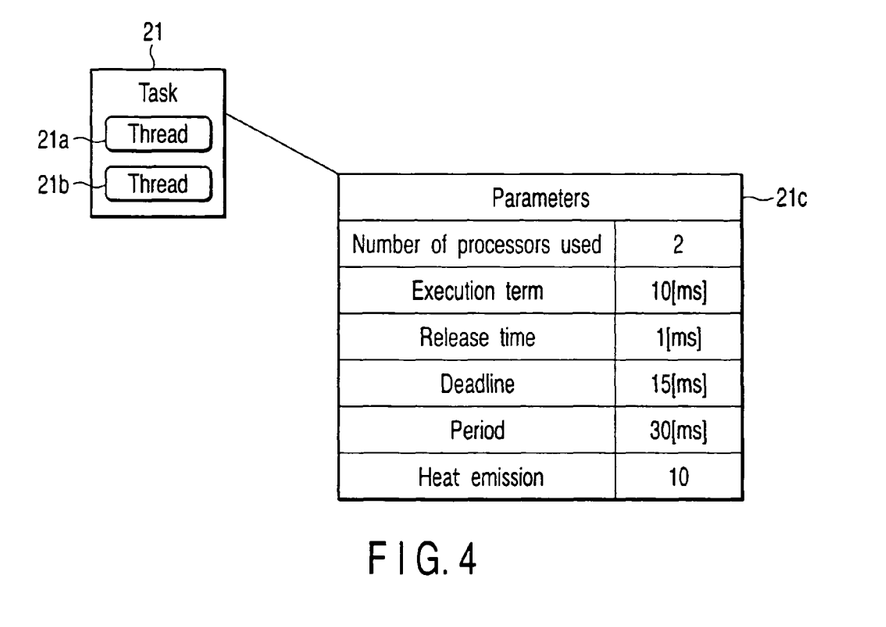
FIG. 4 is a schematic diagram for explaining parameters in the embodiment.
Figure 5:
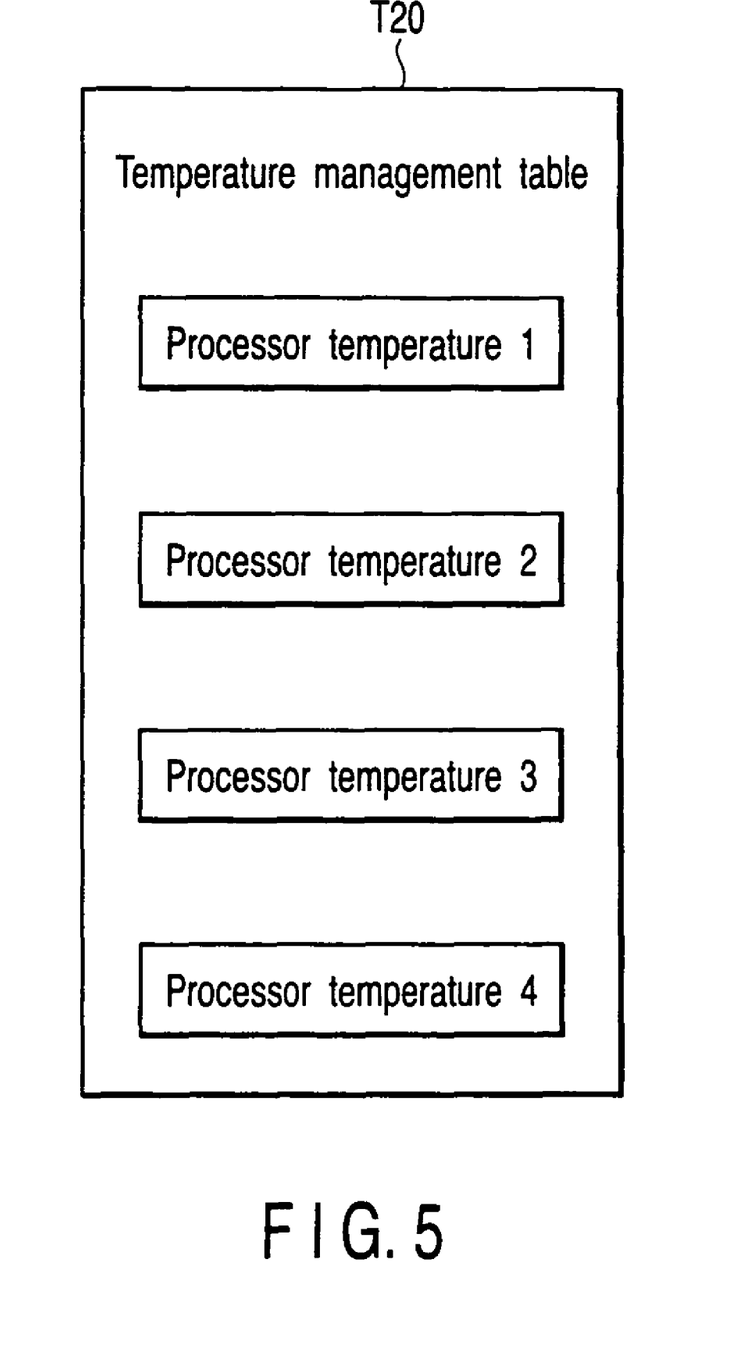
FIG. 5 is a schematic diagram for explaining tables in the embodiment.
Figure 6:
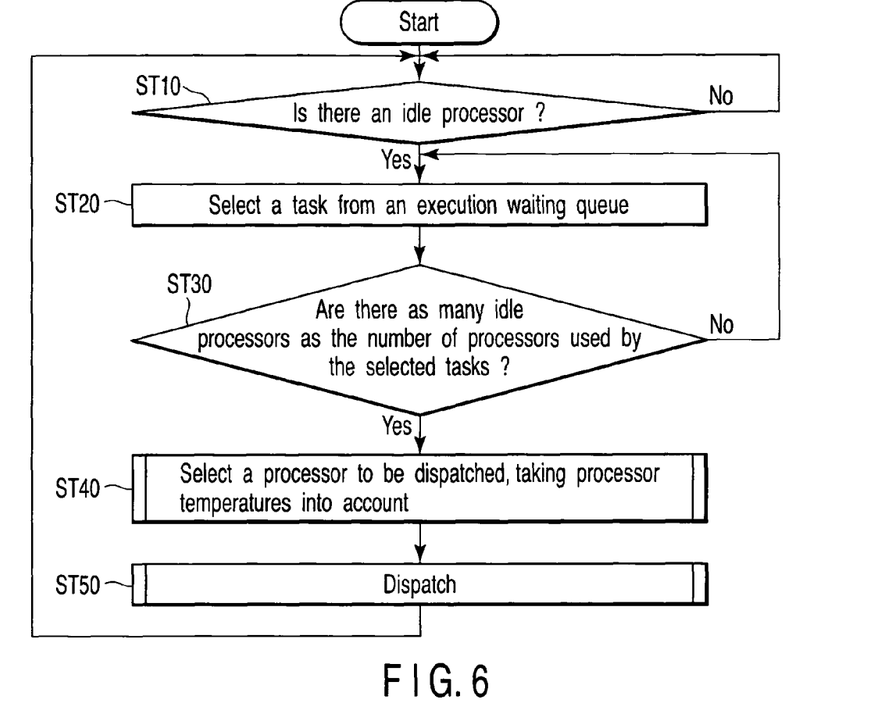
FIG. 6 is a flowchart for explaining operation in the embodiment.
Figure 7:
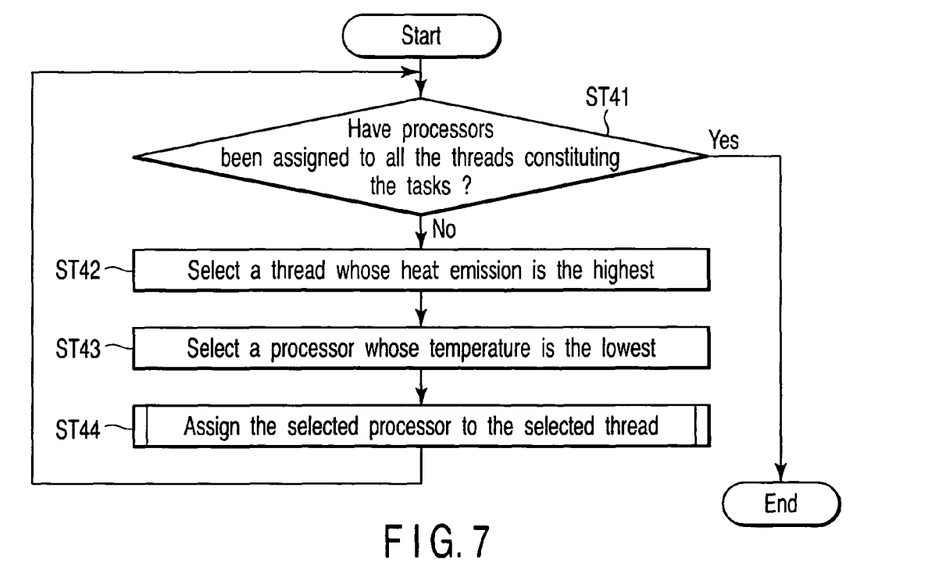
FIG. 7 is a flowchart for explaining operation in the embodiment.

The shared memory 12 is a memory which is readable and writable by the processors P1 to P4 and the control IC 13. For example, the shared memory 12 stores a processing 20 and a task 21 as shown in FIGS. 3 and 4 explained below, . . . , a table T20 as shown in FIG. 5, scheduling programs as shown in FIGS. 6 and 7, and temperature measurement results by the temperature sensors ts1 to ts5, etc. Each of the processors P1 to P4 may have a memory instead of the shared memory 12, or each of the processors P1 to P4 may have a memory in addition to the shared memory 12. The scheduling programs are installed in advance in the multiprocessor computer 10 from a network or a storage medium M.

The control IC 13 corresponds to the system controlling processor described above, and performs dynamic scheduling to assign tasks to the processors P1 to P4, on the basis of the scheduling programs stored in the shared memory 12 and the measurement results by the temperature sensors ts1 to ts5. The control IC 13 has a function of causing each of the processors P1 to P4 to execute a task on the basis of the scheduling result.

The scheduling process includes an extraction process of, when at least one of the processors P1 to P4 is executing a plurality of tasks, extracting one or more processors that do none of the plurality of tasks, a first selection process of selecting one processor whose temperature sensed by the temperature sensors ts1 to ts4 is the lowest from one or more processors extracted in the extraction process, a second selection process of, when assigning a task to be newly executed to any ones of the processors extracted in the extraction process, referring to the heat emissions included in the tasks to be newly executed and selecting the task whose heat emission is the highest, an assignment process of assigning the task selected in the second selection process to the processor selected in the first selection process, a decision process of, after the assignment process has assigned the task, deciding whether all of the tasks to be newly executed have been assigned to the processors, and a control process of, when the decision process has decided that all of the tasks have not been assigned to the processors, controlling the first selection process, second selection process, and assignment process so as to assign unassigned tasks to two or more processors.

The interfaces I/F1 to I/F6 are connected to the interconnect 14 which is formed in a ring shape, and enable data transmission along the interconnect 14. As long as mutual data transmission is possible, the interconnect does not necessarily have such a ring shape. For example, the processors P1 to P4 and the shared memory 12 may be connected by using one or more buses. As another structure, processor may be directly connected to all of the other processors. The multiprocessor computer 10 can adopt various connecting methods as a method of connecting processors, such as bus type, array type, and ring type.

Next, the concept of processes, tasks, and threads which are executed by the processors P1 to P4 are explained, with reference to FIG. 3. The multiprocessor computer 10 executes one or more processes 20. A process 20 comprises a plurality of tasks 21 to 24, for example. Each of the tasks 21 to 24 is formed of threads of a number equal to the number of processors to be used. For example, a task 21 which requires 2 processors comprises two threads 21a and 21b. The other tasks are formed as follows. A task 22 is formed of a thread 22a. A task 23 is formed of threads 23a and 23b. A task 24 is formed of a thread 24a.

Thread(s) included in each task is(are) assigned to the respective processors, and each thread is executed as a job. For example, if the task 21 is periodically executed, processors are periodically assigned to the threads 21a and 21b, and each thread is periodically executed as a job.

The processes may include controlling progress of the process by precedence constraints which designate the execution order of tasks. For example, in the process 20, a precedence constraint 25 designates the task 21 to be executed prior to the task 22, and a precedence constraint 26 designates the task 21 to be executed prior to the task 23. Task 22 and 23 are executed after end of the task 21, on the basis of the designations by the precedence constraints 25 and 26. Further, in the process 20, a precedence constraint 27 designates the task 22 to be executed prior to the task 24, and precedence constraint 28 designates the task 23 to be executed prior to the task 24. The task 24 is executed after ends of the tasks 22 and 23, on the basis of the designations by the precedence constraints 27 and 28. If it is unnecessary to designate the processing order, the execution order of tasks may not be designated by precedence constraints.

Next, FIG. 4 shows an example of parameters assigned to real-time tasks which are executed in real time. For example, parameters 21c are assigned to the task 21 in advance. The parameters include the number of processors to be used, execution term (the length of processing time), release time (time when processing can be started), deadline (processing completion time), period, and heat emission. If the parameters include the period, the execution term, release time, and deadline mean the execution term, release time, and deadline, respectively, in a cycle of a job which is periodically executed. The heat emission is data indicating a heat emission generated if a processor executes the task 21 for the execution term. If a task includes a plurality of threads, the heat emission can be designated for each thread.

Using FIG. 5, a temperature management table T20 for managing the temperature of each processor will be explained.

The temperature management table T20 is a table in which the present processor temperatures sensed by the temperature sensors ts1 to ts4 are stored according to the IDs of the processors P1, P2, . . . , P4.

Next, the operation of the multiprocessor computer having the above structure is explained with reference to the flowcharts of FIGS. 6 and 7. The operation of the whole computer is explained first, and then the dynamic scheduling operation is described in detail.

(Operation of Whole Computer)

First, the control IC 13 senses the temperatures of the processors P1 to P4 with the temperature sensors ts1 to ts4. In addition, as shown in FIG. 6, the control IC 13 waits for any one of the processors P1 to P4 to become idle (ST10). Here, "idle" means that the processor executes none of the threads. When any one of the processors P1 to P4 becomes idle (Yes in ST10), one or more processors which have become idle are extracted and a task is selected (or extracted) from a task execution waiting queue (ST20). When there are a plurality of execution waiting tasks, for example, tasks are selected in the order of fixed or dynamic priority, in increasing order of period, or in increasing order of deadline. Next, the control IC 13 checks whether there are as many idle processors as the number of processors to be used by the selected tasks (ST30).

If the number of idle processors is less than the number of processors to be used by the selected tasks, the control IC 13 selects another task from the execution waiting queue. Alternatively, the control IC 13 may wait for more idle processors than the number of processors to be used by the selected tasks to appear.

If the number of idle processors is larger than the number of processors to be used by the selected tasks, the control IC 13 assigns processors to the threads constituting the tasks in such a manner that the temperatures of the individual processors are almost level (ST40). Specifically, dynamic scheduling is done, taking into account the temperatures of the processors and the heat emissions of the relevant tasks or threads. The details of dynamic scheduling will be given later.

After the completion of scheduling, the control IC 13 dispatches threads (ST50). After the dispatch, the control IC 13 returns to step ST10.

(ST40: Dynamic Scheduling Process)

As shown in FIG. 7, the control IC 13 checks whether it has assigned processors to all of the threads constituting the tasks (ST41). If having assigned processors to all of the threads, the control IC 13 completes assigning processors.

If the result of step ST41 has shown that there are threads to which processors have not been assigned, the control IC 13 performs the following processes. First, of the threads to which processors have not been assigned, the control IC 13 selects the thread whose heat emission is the highest (ST42). In addition, the control IC 13 refers to the temperature management table T20 which lists the processor temperatures sensed by the temperature sensors ts1 to ts4 and selects the processor whose temperature is the lowest from the idle processors (ST43). Then, the control IC 13 assigns the selected processor to the selected thread (ST44). After the assignment, the control IC 13 returns to step ST41.

While the processor temperatures have been sensed by the temperature sensors, the present invention is not limited to this. For instance, the accumulated heat emissions of the relevant processors may be calculated on the basis of the parameters for heat emissions given to the individual tasks or threads and the resulting values may be used as the processor temperatures.

As shown in FIG. 4, the heat emission of each task or thread may be found, referring to the parameters for the heat emission added. Alternatively, the temperature measured when the processor was actually run before the preceding execution may be used.

While in the flowchart of FIG. 7, a processor to be assigned to a thread has been decided on the basis of the present processor temperature and thread heat emission, the processor temperature after the thread execution may be estimated more accurately by doing transient heat conduction simulation using a temperature model on the basis of the present processor temperature and thread heat emission.

As described above, according to this embodiment, the processor whose temperature is the lowest is assigned to the task whose heat emission is the highest. Therefore, the processors are level in the processor temperatures among the processors, and it is suppress occurrence of stop of processes due to overheating.

Second Embodiment

Next, a multiprocessor computer according to a second embodiment of the present invention is explained with reference to FIGS. 1 to 5. The second embodiment is a modification of the first embodiment. The second embodiment executes a dynamic scheduling method, taking into account the possibility that there will be an overheated processor.

Figure 8:
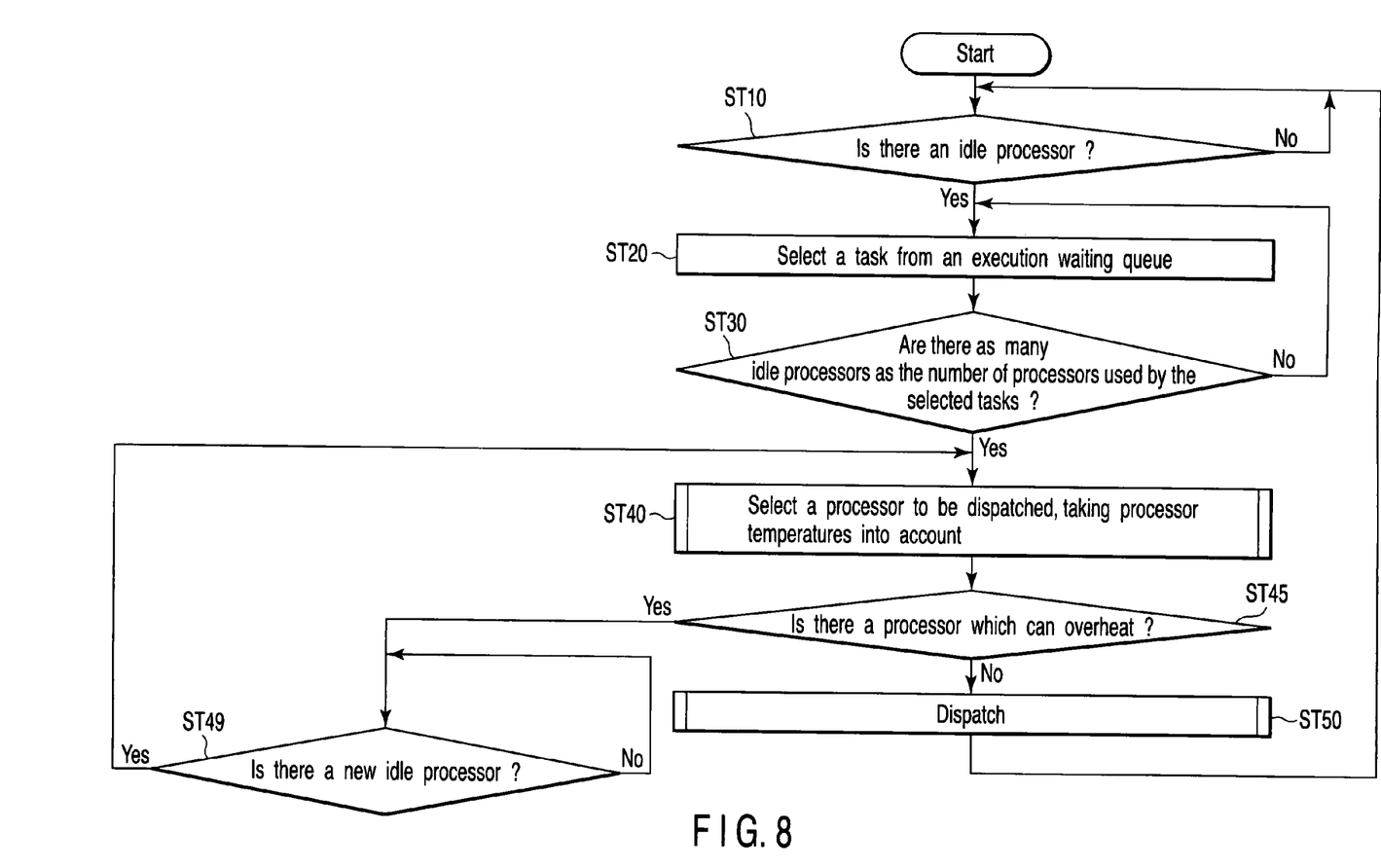
FIG. 8 is a flowchart for explaining the operation of a multiprocessor computer according to a second embodiment of the present invention.

In conformity with this system, the control IC 13 performs operations shown in FIG. 8, instead of the operations shown in FIG. 6. The operations of FIG. 7 are carried out as described above.

(Operation of Whole Computer)

As shown in FIG. 8, the control IC 13 performs the operations in step ST10 to step ST40 as described above. Step ST40 includes step ST41 to ST44 as described above.

Next, the control IC 13 checks whether there is a processor which can overheat (ST45). If there is no processor which can overheat, the control IC 13 dispatches threads according to the assignation of processors as described above (ST50).

If there is a processor which can overheat, the control IC 13 waits for a new idle processor to appear in addition to the present idle processors (ST49). At this time, while waiting for a new idle processor, the control IC 13 may turn off the power supply of the unused idle processors, thereby suppressing the heat emission of the processors. In addition, while a new idle processor is being waited for, the temperature of an existing unused idle processor drops and therefore there is no possibility that the processor will overheat, the control IC 13 may dispatch a thread to the existing unused idle processor.

When there is a new idle processor, the control IC 13 returns to step ST40 and assigns the processor to a thread again.

As described above, according to the second embodiment, when there is a processor which can overheat, the control IC 13 waits for a new idle processor to appear, and suppresses occurrence of stop of processing due to overheating reliably in addition to the effect of the first embodiment.

Third Embodiment

Next, a multiprocessor computer according to a third embodiment of the present invention is explained with reference to FIGS. 1 to 5. This embodiment is a modification of the second embodiment. In the third embodiment, the control IC 13 decides the possibility that scheduling is feasible, taking dispatch delay time into account.

For example, in the second embodiment, when there is an overheated processor, the dispatch of threads is delayed. However, in a method where an algorithm in the dynamic scheduling method assures real-time processing, the dispatch delay time to avoid overheating is not taken into account when the feasibility of scheduling is checked in advance. As a result, the decision of the feasibility of scheduling becomes invalid. Therefore, the feasibility of scheduling has to be checked again, taking dispatch delay time into account.

In the third embodiment, the feasibility of scheduling is decided, taking dispatch delay time into account in advance, so as to avoid the re-check of the feasibility of scheduling.

Figure 9:
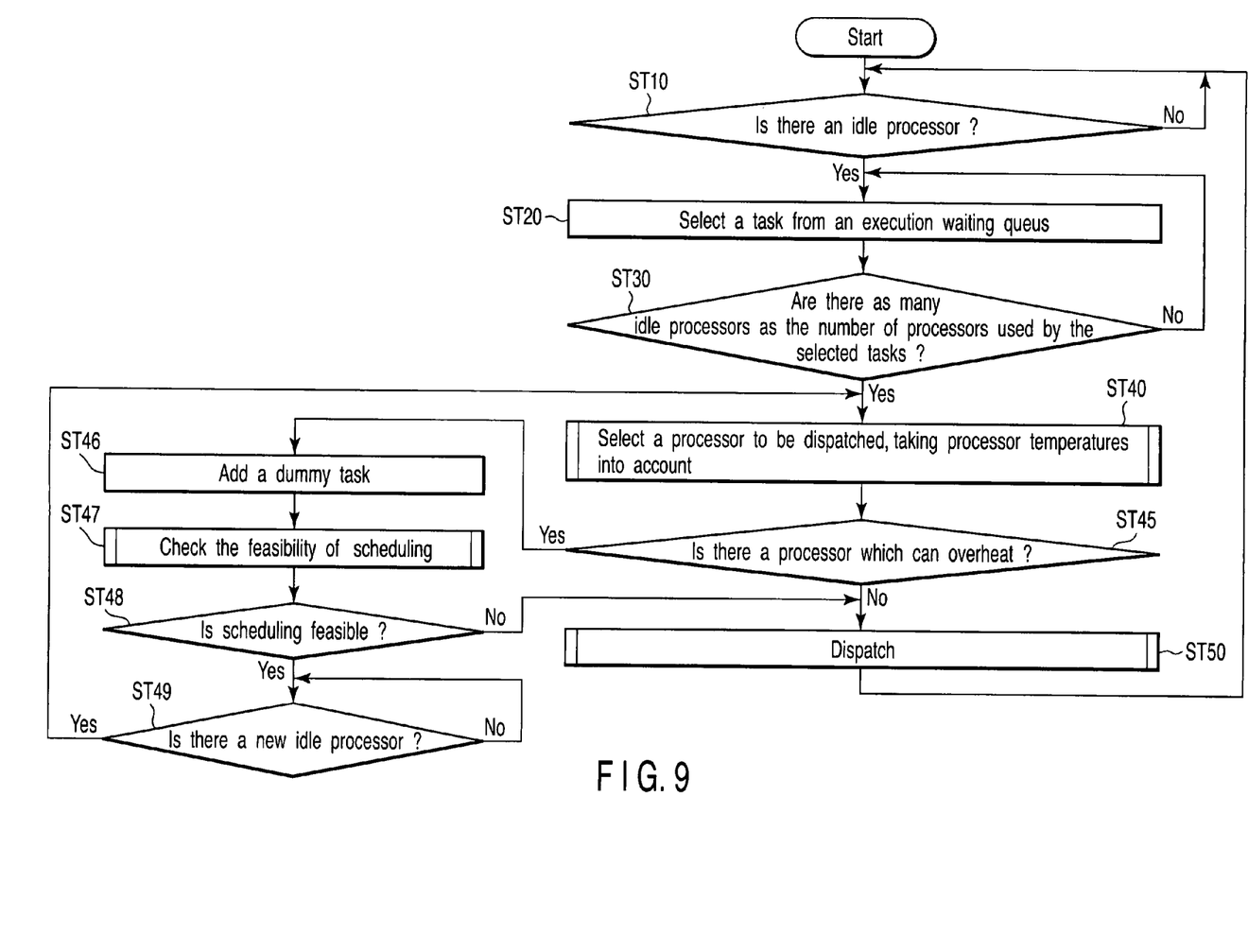
FIG. 9 is a flowchart for explaining the operation of a multiprocessor computer according to a third embodiment of the present invention.

In conformity with this system, the control IC 13 performs operation of FIG. 9, instead of the operation of FIG. 8. The operation of FIG. 7 is performed as described above.

Next, the operation of the multiprocessor computer having the above structure is explained.

As shown in FIG. 9, the control IC 13 executes the processes in step ST10 to ST45 as described above, and checks whether there is a processor which can overheat (ST45). If there is no processor which can overheat, the control IC 13 dispatches threads as described above (ST50).

If there is a processor which can overheat, the control IC 13 creates a dummy task which has as long an execution term as the term in which a new idle processor is waited for to appear in addition to the present idle processors, and adds the dummy task to a set of tasks currently being executed (ST46). The heat emission of the dummy task is almost zero. The dummy task is a task for causing a processor to stand by.

For the dummy task to be given priority for scheduling, suitable parameters have to be set according to the dynamic scheduling algorithm. For example, when scheduling is done in increasing order of period, the shortest one of the periods of all the tasks has to be set as the period of the dummy task. When scheduling is done in increasing order of deadline, the sum of the present time and the execution term of the dummy task have to be set as the deadline of the dummy task.

After the dummy task has been added, the feasibility of scheduling is checked for a set of tasks being executed (ST47).

On the basis of the result of the decision of the feasibility of scheduling, the control IC 13 decides whether scheduling can be done (ST48). If the result of the decision has shown that scheduling isn't feasible, the dispatch of the tasks cannot be delayed. Therefore, the control IC 13 dispatches the tasks without waiting for a new idle processor (ST50). At this time, when a processor has evidently overheated and therefore it is obvious that a system failure will occur, the control IC 13 may stop the execution of the tasks or execute an abnormal stop of the system.

If the result of the decision in step ST48 has shown that scheduling is feasible, the control IC 13 waits for a new idle processor to appear in addition to the present idle processors (ST49). At this time, while the control IC 13 is waiting for a new idle processor to appear, it may stop the power supply of the unused idle processors, thereby suppressing the heat emission of the processors. In addition, while the control IC 13 is waiting for a new idle processor to appear, when the temperature of an existing unused idle processor has dropped and therefore the processor may not overheat, the control IC 13 may dispatch a thread to the existing unused idle processor.

When there is a new idle processor, the control IC 13 returns to step ST40 and assigns processors to threads again.

As described above, according to the third embodiment, in the dynamic scheduling method that assures real-time processing, when the occurrence of an overheated processor is avoided, a dummy task whose execution period is as long as the period during which a new idle processor is waited for is created and the feasibility of scheduling is checked, taking the dispatch delay time (the execution term of the dummy task) into account. Therefore, this not only produces the effect of the second embodiment but also makes it possible to avoid the re-check of the feasibility of scheduling.

Note that the techniques described in the above-described respective embodiments are stored as programs which can be executed by computers in storage media such as magnetic disks (floppy (registered trademark) disks, hard disks, and the like), optical disks (CD-ROM/DVD and the like), optical magnetic disks (MO), semiconductor memories, and the like, and can be distributed.

Further, as the storage media, storage media which can store programs therein and out which computers can read may have any form of the storing system.

Further, middle ware (MW) or the like such as operating system (OS), database management software, network software, or the like, which is working on a computer on the basis of an instruction of the program installed in the computer from the storage medium may execute some of the respective processes for realizing the present embodiment.

Moreover, the storage media in the present invention are not limited to media independent of the computer, and storage media in which a program transmitted via LAN, Internet, or the like is downloaded, and stored or temporarily stored are included therein.

Further, the storage medium is not limited to one, and a case where the processes in the present embodiment are executed from a plurality of media is included in the storage medium in the present invention, and the medium configuration may be any configuration.

Note that, the computer in the present invention is to execute the respective processes in the present embodiment on the basis of the program stored in the storage medium, and may be any configuration of an apparatus formed from one such as a personal computer, a system in which a plurality of apparatuses are connected through a network, and the like.

Note that the computer in the present invention is not limited to a personal computer, and includes an arithmetic processing device, a microcomputer, and the like included information processing equipment, and is general term for equipment/apparatus which can realize the functions of the present invention by the program.

Note that the present invention is not limited to the above-described embodiments as are, and structural requirements can be modified and materialized within a range which does not deviate from the gist of the present invention at the practical phase. Further, various inventions can be formed due to the plurality of structural requirements which have been disclosed in the above-described embodiments being appropriately combined. For example, several structural requirements may be eliminated from all of the structural requirements shown in the embodiments. Moreover, structural requirements over different embodiments may be appropriately combined.

What is claimed is:

1. A multiprocessor computer which performs a plurality of tasks with a plurality of processors connected to one another, comprising:
    a plurality of temperature sensing devices configured to sense temperatures of the plurality of processors;
    a storage device which stores a temperature management table in which the temperatures sensed by the plurality of temperature sensing devices are stored according to identifications of the plurality of processors;
    wherein the each of the plurality of tasks is individually associated with a heat emission parameter, the heat emission parameter indicating a heat emission generated if a processor executes the task;
    an extraction device configured to select one or more processors that execute none of the plurality of tasks, when at least one of the other processors of the plurality of processors is executing the plurality of tasks;
    a first selection device configured to select one processor whose temperature sensed by the temperature sensing devices is the lowest from the one or more processors, that execute none of the plurality of tasks, selected by the extraction device, based on the temperature management table;
    a second selection device configured to refer to heat emission parameters associated with a plurality of tasks to be newly executed and select a task whose heat emission is the highest, when the plurality of tasks to be newly executed are to be assigned to any ones of the processors selected by the extraction device;
    an assignment device configured to assign the task selected by the second selection device to the processor selected by the first selection device;
    a decision device configured to decide whether there is one or more tasks from the plurality of tasks to be newly executed that have not yet been assigned to a processor by the assignment device; and
    a control device configured to control the first selection device, second selection device, and assignment device to assign unassigned tasks to the plurality of processors, when the decision device has decided that there is one or more tasks from the plurality of tasks to be newly executed that have not yet been assigned to processors by the assignment device,
    the assignment device further including
        an overheating prediction device configured to predict whether there is a processor which could overheat, on the basis of the temperatures sensed by the temperature sensing devices, after all the tasks to be newly executed have been assigned to the processors by the assignment device, but before the tasks are dispatched to the processors, and
        a stand-by device configured to turn off a power supply of the processor that could overheat predicted by the overheating prediction device without dispatching the tasks until the extraction device has extracted another processor, when the result of the prediction has shown that there is the processor that could overheat if a task is dispatched to the processor; and
    the stand-by device including
        a dummy task creating device configured to create a dummy task which has an execution time as long as a waiting time of a task to be dispatched until the extraction device has extracted another processor and whose heat emission is approximately zero and which is given priority in execution over other tasks,
        a dummy task adding device configured to add the dummy task to a set of tasks currently being executed,
        a scheduling decision device configured to decide whether scheduling is feasible on a set of tasks being executed, taking the waiting time of the task to be dispatched into account, after the addition of the dummy task, and
        a scheduling device configured to execute the scheduling in such a manner that the dummy task is given priority in execution over other tasks, when the result of the decision has shown that scheduling is feasible.

2. A computer-readable storage media encoded with computer executable instructions, which when executed by a multiprocessor computer which performs a plurality of tasks with a plurality of processors connected to one another, cause the multiprocessor computer to perform a method comprising:
    executing temperature sensing processes of sensing temperatures of the plurality of processors;
    storing a temperature management table in which the temperatures sensed of the plurality of processors are stored according to identifications of the plurality of processors;
    wherein the each of the plurality of tasks is individually associated with a heat emission parameter, the heat emission parameter indicating a heat emission generated if a processor executes the task;
    executing an extraction process of selecting one or more processors that execute none of the plurality of tasks, when at least one of the other processors of the plurality of processors is executing the plurality of tasks;
    executing a first selection process of selecting one processor whose temperature sensed in the temperature sensing process is the lowest from the one or more processors, that execute none of the plurality of tasks, selected in the extraction process, based on the temperature management table;

executing a second selection process of referring to heat emission parameters associated with a plurality of tasks to be newly executed and selecting a task whose heat emission is the highest, when the tasks to be newly executed are to be assigned to any ones of the processors selected in the extraction process;

executing an assignment process of assigning the task selected in the second selection process to the processor selected in the first selection process;

executing a decision process of deciding whether there is one or more tasks from the plurality of tasks to be newly executed that have not yet been assigned to a processor in the assignment process; and controlling the first selection process, second selection process, and assignment process sequentially to assign unassigned tasks to the plurality of processors, when the decision process has decided that there is one or more tasks from the plurality of tasks to be newly executed that have not yet been assigned to processors by the assignment process, the assignment process further including an overheating prediction process which predicts on the basis of the temperatures sensed by the temperature sensing devices whether there is a processor to be overheated, after all the tasks to be newly executed have been assigned to the processors in the assignment process, but before the tasks are dispatched to the processors, and a stand-by process which turns off a power supply of the processor to be overheated predicted in the overheating prediction process without dispatching the tasks until the extraction process has extracted another processor, when the result of the overheating prediction process has shown that there is the processor to be overheated predicted in the overheating prediction process if a task is dispatched to the processor; and the stand-by process including a process of creating a dummy task which has an execution time as long as a waiting time of a task to be dispatched until the extraction process has extracted another processor and whose heat emission is approximately zero and which is given priority in execution over other tasks, a process of adding the dummy task to a set of tasks currently being executed, a process of deciding whether scheduling is feasible on a set of tasks being executed, taking the waiting time of the task to be dispatched into account, after the addition of the dummy task, and a process of executing the scheduling in such a manner that the dummy task is given priority in execution over other tasks, when the result of the decision has shown that scheduling is feasible.

* * * * *